(12) United States Patent
Park (10) Patent No.: US 7,526,867 B2
(45) Date of Patent: May 5, 2009

(54) TOOL WITH CLAMPING APPARATUS AND AN IMPROVED SCROLLING MECHANISM

(75) Inventor: Keith Park, Ellerton (GB)

(73) Assignee: GMCA PTY Limited, Campbellfield, Victoria (AU)

( * ) Notice: Subject to any disclaimer, the term of this patent is extended or adjusted under 35 U.S.C. 154(b) by 778 days.

(21) Appl. No.: 10/665,577

(22) Filed: Sep. 19, 2003

(65) Prior Publication Data

US 2005/0060896 A1 Mar. 24, 2005

(51) Int. Cl.
*B23D 49/00* (2006.01)
(52) U.S. Cl. .................... 30/392; 30/182; 83/699.21
(58) Field of Classification Search ........... 30/392, 30/371, 182; 83/699.21; 451/344, 356
See application file for complete search history.

(56) References Cited

U.S. PATENT DOCUMENTS

| | | | |
|---|---|---|---|
| 2,931,402 A | | 4/1960 | Papworth |
| 4,238,884 A | | 12/1980 | Walton, II |
| 4,545,123 A | | 10/1985 | Hartmann |
| 4,628,605 A | | 12/1986 | Clowers |
| 4,693,009 A | | 9/1987 | Bone |
| 5,267,498 A | * | 12/1993 | Miyamoto et al. ............ 83/781 |
| 5,458,346 A | * | 10/1995 | Briggs ......................... 279/97 |
| 5,487,221 A | * | 1/1996 | Oda et al. ..................... 30/392 |
| 5,819,421 A | | 10/1998 | Giacometti et al. |
| 5,988,034 A | * | 11/1999 | Okubo et al. ............ 83/699.21 |
| 6,230,411 B1 | | 5/2001 | Wall et al. |
| 6,233,833 B1 | * | 5/2001 | Grant et al. ................... 30/392 |
| 6,370,781 B1 | | 4/2002 | Sasaki |
| 6,530,579 B1 | * | 3/2003 | Houben et al. ................ 279/30 |
| 6,662,698 B2 | * | 12/2003 | Wheeler et al. ........... 83/699.21 |
| 2003/0106407 A1 | * | 6/2003 | Wuensch et al. .......... 83/699.21 |
| 2003/0121387 A1 | * | 7/2003 | Wheeler et al. ........... 83/698.71 |
| 2003/0121388 A1 | * | 7/2003 | Wheeler et al. ........... 83/699.21 |
| 2003/0121389 A1 | * | 7/2003 | Wheeler et al. ........... 83/699.21 |
| 2004/0128843 A1 | | 7/2004 | Walker |

(Continued)

FOREIGN PATENT DOCUMENTS

DE 2 303 532 8/1974

(Continued)

OTHER PUBLICATIONS

SKIL Designs New Jigsaws for Modern Do-It-Yourselfers, Enhanced tools offer more features and convenient choices for Do-It-Yourselfers with a variety of cutting needs, Aug. 11, 2002, Chicago (2 pages).

(Continued)

*Primary Examiner*—Timothy V Eley
(74) *Attorney, Agent, or Firm*—Woodard, Emhardt, Moriarity, McNett & Henry LLP (57) ABSTRACT

Cutting apparatus is provided which includes clamping apparatus with two clamping members movable between a clamped position, wherein a portion of the saw blade is secured in position in use, and an unclamped position, wherein the saw blade is movable with respect to the clamping members. The apparatus is attached to or is integrally formed with shaft means which are substantially circular in cross section. The apparatus also includes the ability for user selection to operate the apparatus as a jigsaw or a scroller by operation of a locking mechanism.

8 Claims, 6 Drawing Sheets

U.S. PATENT DOCUMENTS

| | | |
|---|---|---|
| 2004/0168561 A1 | 9/2004 | Tam et al. |
| 2004/0172833 A1 | 9/2004 | Tam et al. |
| 2004/0261274 A1 | 12/2004 | Tam et al. |

FOREIGN PATENT DOCUMENTS

| | | |
|---|---|---|
| DE | 43 13 718 A1 | 11/1994 |
| DE | 4313718 A1 * | 11/1994 |
| DE | 198 05 675 A1 | 8/1998 |
| DE | 103 28 061 A1 | 1/2005 |
| EP | 0 587 498 A1 * | 3/1994 |
| GB | 2 322 594 A | 9/1998 |
| WO | WO 2005/000510 A1 | 1/2005 |

OTHER PUBLICATIONS

SKIL Jigsaw Model F012445500 (4455) Drawings, S-B Power Tool Company, Chicago, IL 60646-5999, Aug. 1997 (1 page).

SKIL Jigsaw Model F012447000 (4470) Drawings, S-B Power Tool Company, Chicago, IL 60646-5999, Apr. 1997 (1 page).

SKIL Jigsaw Model F012448000 (4480) Drawings, S-B Power Tool Company, Chicago, IL 60646-5999, Jan. 2003 (2 pages).

SKIL Jigsaw Model F012454000 (4540) Drawings, S-B Power Tool Company, Chicago, IL 60646-5999, Jan. 2003 (2 pages).

SKIL Jigsaw Model F012458001 (4580) Drawings, S-B Power Tool Company, Chicago, IL 60646-5999, Jan. 2003 (2 pages).

SKIL® Power Tools, SKIL Brightens Home Improvement with New Lighted Tools, Oct. 11, 2002, © 2002 NewsWire One (2 pages).

New SKIL Jigsaws are More Consumer Friendly, Aug. 17, 2001 (2 pages).

SKIL® Operating/Safety Instructions, Model Nos. 4480, 4540, 4580, Apr. 19, 2003, © Robert Bosch Tool Corporation (40 pages).

Black & Decker® Jigsaws User Manual, Model Nos. KS629, KS630, KS631, KS632, KS633, KS634, KS635, KS638, May 11, 1998 (12 pages).

Black & Decker® Jigsaws User Manual, Model Nos. KS630, KS631, KS632, KS633, KS634, KS635, KS638, Nov. 5, 1998 (7 pages).

* cited by examiner

TOOL WITH CLAMPING APPARATUS AND AN IMPROVED SCROLLING MECHANISM

BACKGROUND

This invention relates to a clamping apparatus for a tool component, such as a saw blade, suitable for use with a tool, such as a jigsaw or reciprocating saw. A second aspect of the present invention relates to an improved scrolling mechanism for a tool, such as a jigsaw or reciprocating saw.

It will be appreciated by persons skilled in the art that the first and second aspects of the present invention can be used together and/or independently of each other. In addition, whilst the following description refers almost exclusively to clamping apparatus and a scrolling mechanism for use with a jigsaw, it will be appreciated that both invention aspects can be used with any tool as required.

Tools, such as jigsaws, power saws or reciprocating saws, are typically provided with releasable blade clamping means for allowing saw blades to be replaced, removed and/or repaired as and when required. There are many different types of blade clamping means available and one example is disclosed in EP0587498 wherein a support is provided on a slideway which defines an engagement passage for a tail end of a saw blade. A retractable locking member is secured to the support and interacts directly with a protrusion portion on the saw blade. In order for a user to release the blade, they are required to move the retractable locking member. Since this release mechanism requires the user to directly come into contact with the blade, if the user accidentally slips during this maneuver they are likely to cut themselves on the blade, which is undesirable.

A further example of a blade clamping arrangement is disclosed in DE4313718. In this arrangement, two clamping jaws are provided which are radially movable relative to the longitudinal axis of a blade stroke shaft. In a clamped position jaws are pressed against opposite flat sides of the blade by a wedge mechanism. The wedge mechanism is formed by a screwcap having an inner conical surface. The outer surfaces of the clamping jaws are shaped so that movement of the screw cap with respect to the jaws moves the jaws between clamped and unclamped positions. Since the blade release mechanism is likely to require multiple rotations of the screw cap to move the same between said clamped and unclamped positions, this increases the time taken for a user to attach or release a blade. A problem associated with other blade clamping arrangements includes the requirement of special tools to enable the release and/or attachment of the blade to the tool.

A further known type of blade release mechanism includes a slidable sleeve member for movement of clamping jaws between clamped and unclamped positions. In this mechanism the clamping apparatus is connected to a shaft which is substantially square in cross section. A problem with this arrangement is that it cannot be easily used in combination with a scrolling mechanism or other mechanism wherein the orientation of the tool component held by the clamping apparatus needs to be moved via the shaft in use of the tool.

SUMMARY

It is an object of the present invention to provide an improved scrolling mechanism which allows a user to both quickly and easily move a tool to a scrolling mode from a further working mode, such as a jigsaw cutting mode.

It is a further object of the present invention to provide an improved clamping arrangement for a tool component, such as a saw blade, which allows quick and easy release of the component in a single step therefrom without requiring the user to manipulate the component directly to actuate release thereof.

According to a first aspect of the present invention there is provided a scrolling mechanism for a jigsaw, said jigsaw including a saw blade and said scrolling mechanism allowing movement of said saw blade between one or more required positions in use, said scrolling mechanism including at least first and second locking members, said locking members movable relative to each other between a first locked position, wherein the locking members are engaged and the position of the saw blade is substantially fixed, and a second unlocked position, wherein the locking members are disengaged and the position of the saw blade can be changed.

Typically the jigsaw also includes clamping apparatus for clamping a tool component, said clamping apparatus including one or more clamping members movable between a clamped position, wherein at least a portion of said tool component is secured in a required position in use, and an unclamped position, wherein said tool component portion is movable with respect to said clamping members, said clamping apparatus further including user actuation means which are slidably mounted on said apparatus for actuating movement of said clamping members between said clamped position and said unclamped position, characterized in that said clamping apparatus is attached to or integrally formed with shaft means which are substantially circular in cross section.

The shaft means typically forms part of a tool with which the tool component is used. Preferably the shaft means forms part of or is connected to a scrolling mechanism and provision of said shaft means with said substantially circular cross section enables said scrolling mechanism to function. The scrolling mechanism allows movement of the shaft and thus the clamping apparatus and/or tool component between one or more required positions in use.

Preferably the shaft is rotatably mounted in the tool to allow rotation thereof for movement of said clamping apparatus and tool component to the required positions.

In one embodiment the shaft means is capable of undergoing reciprocal movement for reciprocal movement of said clamping apparatus and thus said tool component in said clamped position.

Further preferably the scrolling mechanism includes at least first and second locking members, said locking members movable relative to each other between a first locked position, wherein the locking members are engaged and the position of the clamping apparatus/tool component is substantially fixed, and a second unlocked position, wherein the locking members are disengaged and the position of the clamping apparatus/tool component can be adjusted.

Preferably scrolling actuation means are provided for allowing user actuated movement of at least one of said first and/or second locking members, thereby resulting in relative movement of said first and second locking members between said locked and unlocked positions.

In one embodiment the first locking member is in the form of a locking arm or pin and the second locking member has at least one recess in which the locking arm or pin locates in said locked position.

Preferably the second locking member is rotatably mounted in the tool and is further preferably connected directly or indirectly via mechanical connection means to the shaft means, such that rotation of said second locking member by a user results in movement, and preferably co-axial rotation, of said shaft means, and thus said tool component, to a required position.

In one embodiment, scrolling actuation means are connected either directly or indirectly via mechanical connection means to said first locking member, and movement of said actuation means results in recti-linear movement of said first locking member. The scrolling actuation means are preferably in the form of a rotatable lever or knob.

Preferably said second locking member is in the form of a rotatable lever or knob.

The user actuation means of said clamping apparatus are slidably mounted on said apparatus to allow reciprocal linear sliding motion for movement of said clamping members between said clamped and unclamped positions.

The user actuation means are typically associated with resilient biasing means which biases, either directly or indirectly the actuation means and thus the clamping members to the clamped position. The resilient biasing means typically includes a spring, spring loaded mechanism and/or the like. A user is required to move the actuation means in such a manner so as to overcome the biasing force and move the clamping members to said unclamped position.

Preferably the user actuation means are slidably mounted on a body portion of the apparatus, said body portion defining a cavity in which said first and second clamping members are located.

Preferably an intermediate member is provided between said body portion and said user actuation means, said intermediate member being moved in association with movement of said user actuation means, thereby resulting in movement of said clamping members. The intermediate member can be integrally formed with said user actuation means or attached thereto.

Preferably the clamping members are pivotally mounted in said body portion cavity and undergo pivotal or rotational movement between said clamped and unclamped positions.

The clamping members move radially with respect to the longitudinal axis of the clamping apparatus/body portion. More specifically, sliding movement of said user actuation means causes movement of said clamping members radially outwardly of said apparatus to said unclamped position and radially inwardly of said apparatus to said clamped position.

Preferably the clamping members are wedge shaped with outer surfaces of said clamping members tapering outwardly from the pivot point to said opposite outer edge. At least part of the walls of the body portion defining the cavity can be substantially complementary in shape to said tapered walls of said clamping members.

In one embodiment at least one of said clamping members includes engagement means which engages with complementary engagement means on said intermediate member upon movement of said user actuation means, and thus said intermediate member, from said unclamped to said clamped position.

The engagement means typically include one or more protrusions on said clamping members or said intermediate member which engages with one or more complementary recesses or apertures on the other of said clamping members or said intermediate member.

In a clamped position, a portion of the tool component is clamped between opposing faces of the clamping members.

In a preferred embodiment two clamping members are provided and are movable relative to each other between said clamped and unclamped positions. Each clamping member can be provided with a recess portion along an edge thereof, such that in a clamped position the recess portions of the clamping members are located on adjacent edges to define a larger recess portion. A protrusion portion of said intermediate member typically locates in said larger recess on movement between said unclamped to said clamped positions.

Preferably the tool component has at least one protruding portion at one end thereon, and further preferably a t-shaped formation is provided at one end, thereby providing two diametrically opposed protruding portions on opposite edges of the tool component.

Further preferably the body portion is provided with an aperture or recess for location of at least one of said protruding portions therein. A slot can also be provided in the body portion for location of said tool component into said body portion.

In one embodiment the tool component is a saw blade and the tool is a jigsaw, reciprocating saw and/or the like.

According to a second aspect of the present invention there is provided a tool, said tool including clamping apparatus for clamping a tool component, said clamping apparatus including one or more clamping members, said one or more clamping members movable between a clamped position, wherein at least a portion of said tool component is secured in a required position in use, and an unclamped position, wherein at least a portion of said tool component is movable with respect to said clamping members, said clamping apparatus further including user actuation means for actuating movement of said clamping members between said clamped position and said unclamped position, characterized in that said clamping apparatus is attached to or integrally formed with shaft means which are substantially circular in cross section.

Preferably the tool is a jigsaw or reciprocating saw and is provided with a scrolling mechanism for allowing the orientation of the saw blade to be changed during use.

The advantage of the scrolling mechanism of the present invention is that it is quick and easy to operate and can be used in conjunction with the improved clamping apparatus.

BRIEF DESCRIPTION OF THE DRAWINGS

Embodiments of the present invention will now be described with reference to the accompanying figures, wherein.

DESCRIPTION OF SELECTED EMBODIMENTS

Referring firstly to FIGS. 1-3b, there is illustrated clamping apparatus 2 for releasably clamping a saw blade 4 for use in a power tool, such as a jigsaw 6.

Figure 4:
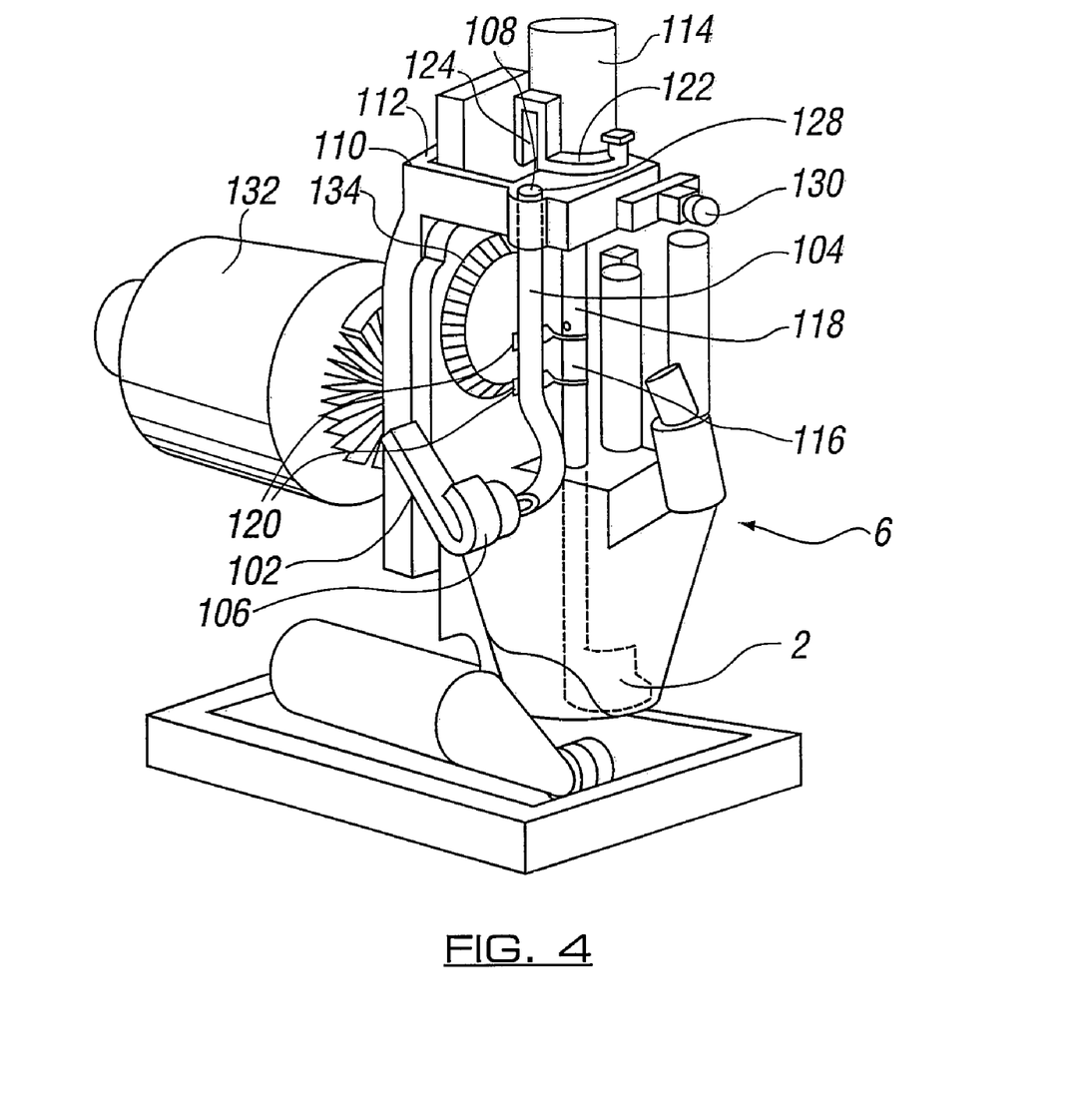
FIG. 4 is a simplified view of the internal components of a jigsaw showing the clamping apparatus and scrolling mechanism.

The clamping apparatus 2 includes a body portion 8 having attachment means in the form of a channel 10 for attachment of the clamping arrangement 2 to shaft means in the form of a reciprocating elongate arm 118 in jigsaw 6, shown in FIG. 4. Elongate arm 118 is substantially circular in cross section with a first end for location in said channel 10. Apertures 11 are defined in the walls of channel 10 for the location of screws for securing arm 118 to body portion 8. Reciprocating arm 118 drives reciprocal movement of clamping apparatus 2 and thus saw blade 4 for allowing cutting/sawing when the tool is in use.

Figure 2A:
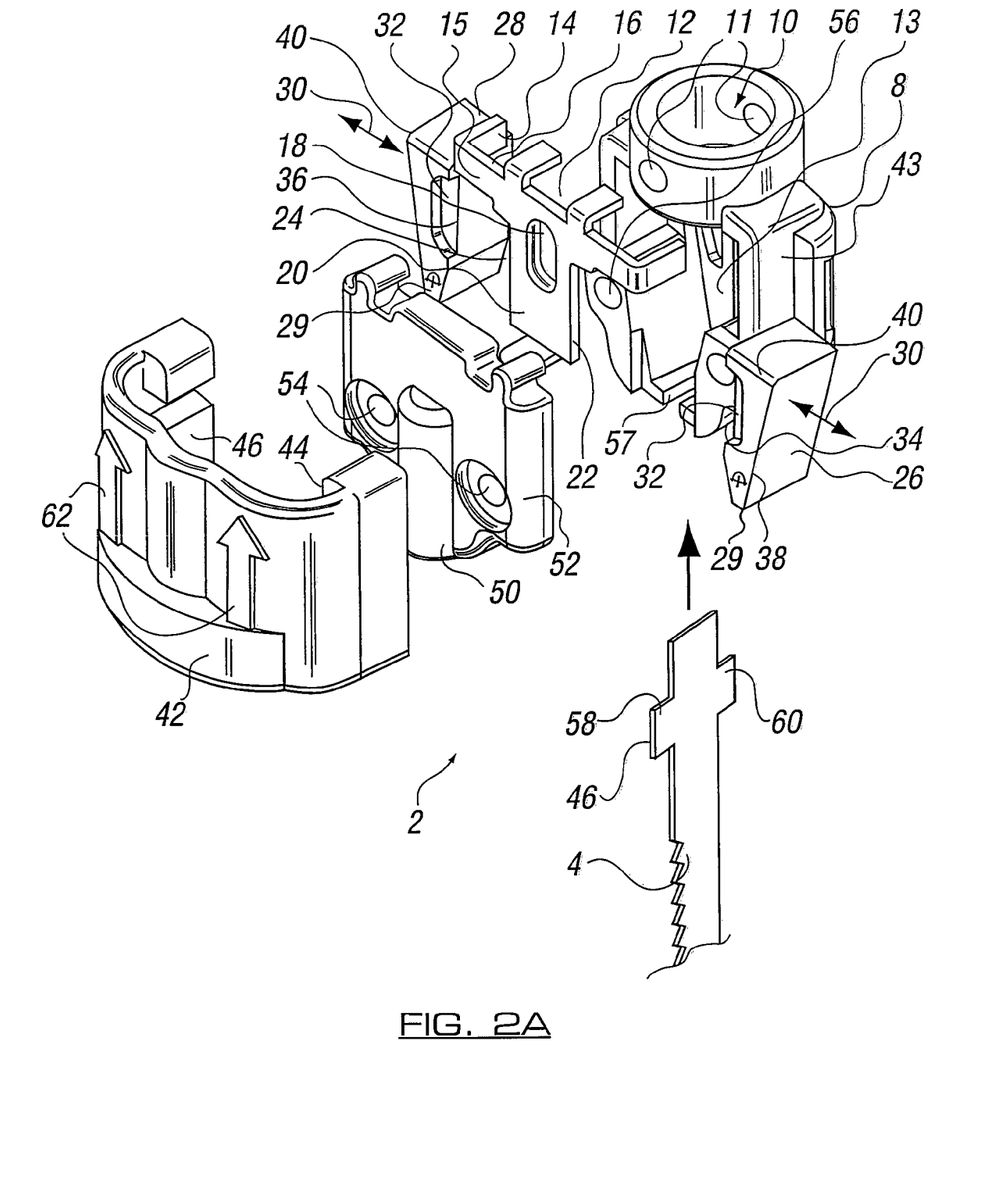
FIG. 2a is an exploded view of the clamping apparatus and saw blade from the front of the apparatus.
Figure 2B:
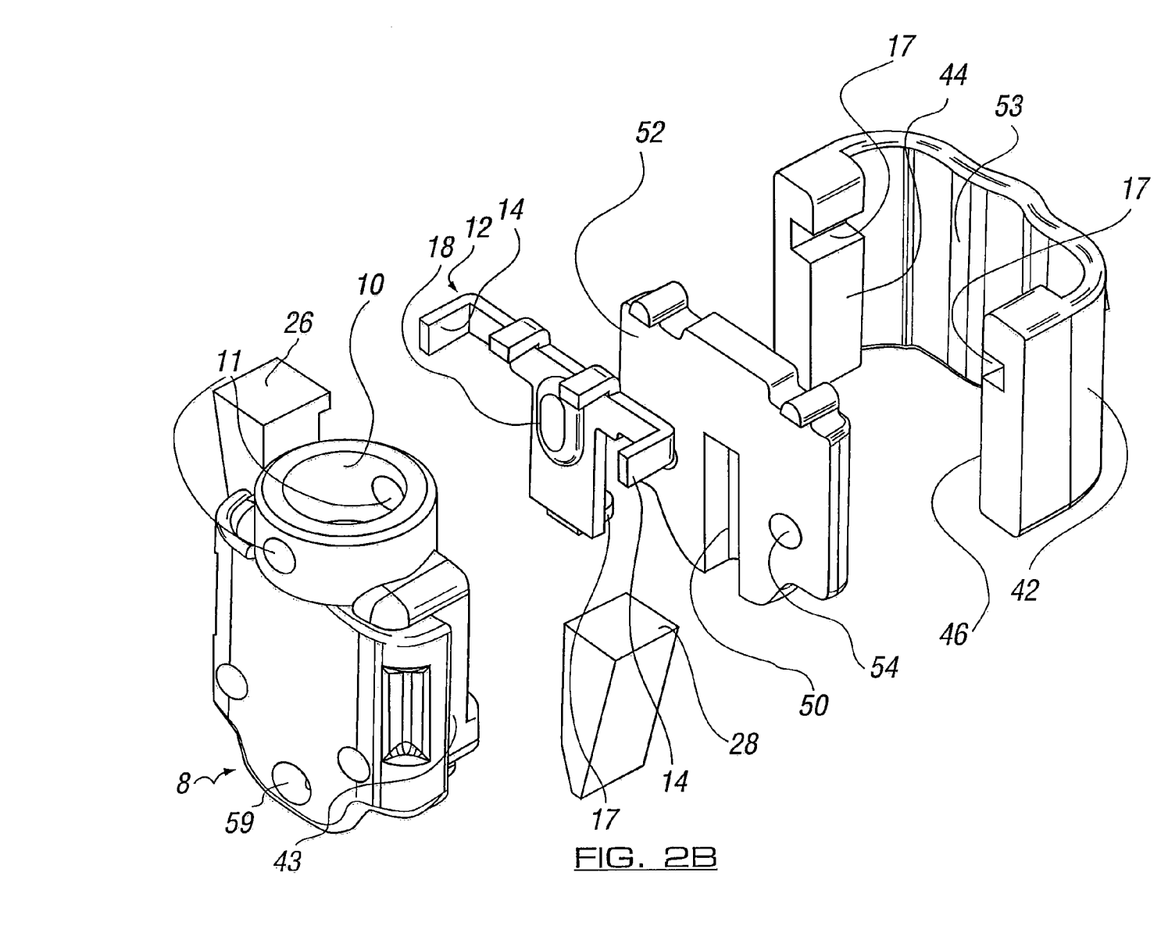
FIG. 2b is an exploded view of the clamping apparatus from the back of the apparatus.

Clamping members 26, 28 are pivotally mounted in a cavity 13 defined in body portion 8 in use. Movement of said clamping members 26, 28 between said clamped and unclamped positions is as a result of movement of an intermediate member 12 which is connected to user actuation means in the form of a sleeve 42. Each clamping member 26, 28 is substantially wedge shaped with the outermost surface 38 of said members tapering outwardly from lower edge 29 to upper edge 40. At least part of the walls of body portion 8 defining cavity 13 is of complementary shape to the outer tapered surface of the clamping members.

Opposing end walls 44, 46 of sleeve 42 are slidably mounted on end walls 43 of body portion 8 to provide reciprocal, linear sliding movement. Intermediate member 12 has attachment arms 14 which locate in complementary shaped recesses 17 on sleeve 42.

Engagement means in the form of a protrusion portion 18 is provided on intermediate member 12 for engagement in engagement means in the form of recess portions 32 on clamping members 26, 28 in a clamped position.

Intermediate member 12 is provided in a t-shaped form with an arm portion 15 located at an upper end of a substantially central body panel 20 and protruding either side thereof. The attachment arms 14 are located along an upper edge 16 of said arm portion 15 and protrusion portion 18 is located on said body panel 20.

Figure 3A:
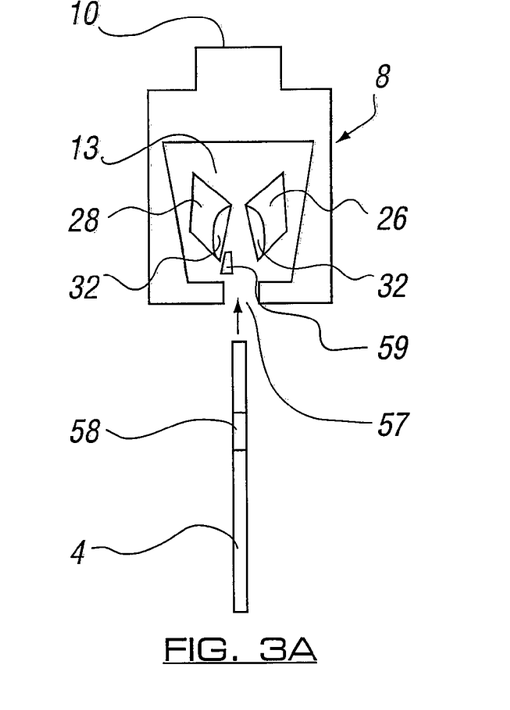
FIGS. 3a and 3b are simplified views showing the clamping members and saw blade in unclamped and clamped positions respectively.
Figure 3B:
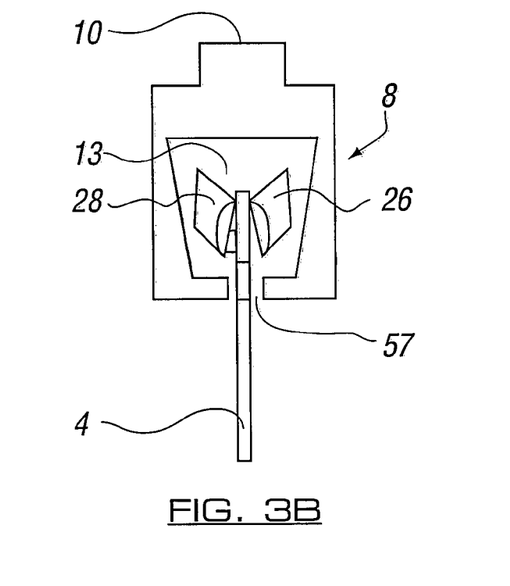

Recess portions 32 are provided on inner side edges 34, 36 of clamping members 26, 28. In use of the apparatus with the clamping members 26, 28 in a clamped position, a saw blade is located therebetween such that opposite surfaces (i.e. front and rear surfaces) of the blade abut clamping faces of said clamping members. Recess portions 32 of the clamping members 26, 28 are adjacent each other but spaced apart by a distance equal to the thickness of the blade, thereby forming a larger recess portion. This larger recess portion is substantially complementary in shape to the protrusion portion 18 on intermediate member 12 for engagement therewith.

Resilient biasing means in the form of a spring (not shown) are provided in housing 52 and bias intermediate member 12 to an unclamped position, wherein protrusion portion 18 is disengaged from recess portions 32 on clamping members 26, 28. Thus, intermediate member 12 is biased in an upwardly direction in this embodiment. Since slidable sleeve 42 is attached to intermediate member 12, sleeve 42 is also biased to said unclamped position. More specifically, flange 17 on the bottom edge of body panel 20 engages with the spring provided in cavity 50 of housing 52. Attachment means in the form of screws are located through apertures 54 on housing 52 and apertures 56 are body portion 8 for securing the housing to the body portion. Housing 52 is located in channel 53 in sleeve 42.

Thus, in use of the clamping apparatus, a user is required to move slidable sleeve 42 in an upwardly direction against the biasing force of the spring, thereby causing clamping members 26, 28 to move radially outwardly with respect to the longitudinal axis of the clamping apparatus. This causes clamping members 26, 28 to separate to an unclamped position. A saw blade 4 having a t-shaped upper end 48 can then be located between the clamping faces of said clamping members 26, 28. A slot 57 is provided in the base of body portion 8 for the location of saw blade therethrough, such that upper end 48 is located in cavity 13.

On release of sleeve 42, the spring biases the sleeve and intermediate member 12 downwardly towards a clamped position. During this movement, protrusion portion 18 locates in recess portions 32 as clamping members 26, 28 pivot about a lower edge 29 thereof towards each other to clamp the saw blade 4 therebetween, as shown by arrows 30. Protruding portion 60 of blade 4 locates in aperture 59 provided in the rear wall of body portion 8, thereby providing further clamping of the saw blade in the apparatus 2. The above method is undertaken in reverse to release the blade by clamping apparatus 2.

Figure 1:
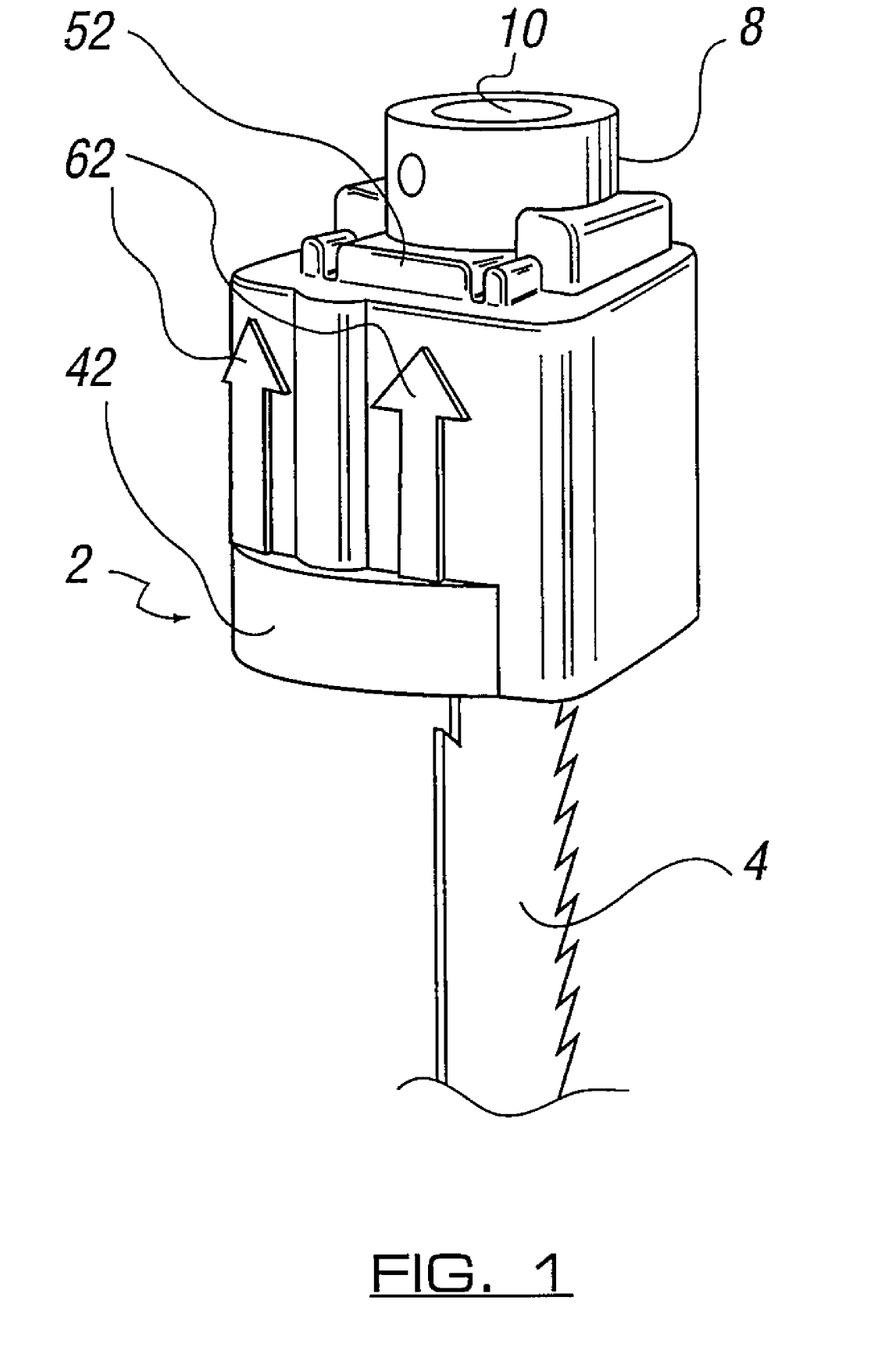
FIG. 1 is a perspective view of clamping apparatus according to an embodiment of the present invention in a clamped position with a saw blade.

Arrows 62 can be provided on outer surface of sleeve 42 to inform the user in the direction which they are required to move the same to an unclamped or blade release position. These arrows can be integrally formed with the sleeve, attached thereto or printed thereon as required.

Referring to FIG. 4, there is illustrated a scrolling mechanism for jigsaw 6 to allow the orientation of blade 4 to be changed by a user during use of the jigsaw.

User actuation means in the form of a lever arm 102 is provided to move jigsaw 6 between one or more cutting modes and a scrolling mode. Lever arm 102 is connected to a first locking member in the form of a locking pin 104 via linkage arrangement 106, such that rotation of lever arm 102 causes linear movement of said locking pin 104.

Locking pin 104 is located through a channel 108 in frame 110 and rotation of lever arm 102 moves pin 104 between a first position, wherein pin 104 protrudes from upper surface 112 of frame 110, and a second position wherein pin 104 is recessed within channel 108.

A second locking member in the form of a rotatable knob 114 is provided on top of jigsaw 6 for rotation by a user. Knob 114 is connected to blade clamping apparatus 2 via linkage arrangement 116, which in this embodiment includes an elongate reciprocating arm member 118. Support members 120 are provided for maintaining the position of arm member 118 and arm member 118 is freely rotatable in apertures provided in support members 120. Rotation of knob 114 rotates elongate arm member 118 and thus blade 4 to provide the required scrolling mechanism.

Knob 114 has a peripheral flange 122 provided on a lower edge thereof and a recess 124 is defined therein, the opening 126 of said recess 124 facing said frame 110. When the jigsaw is in a normal cutting mode (i.e. not a scrolling mode), the recess 124 of knob 114 is aligned with channel 118, thereby allowing engagement of free end 128 of pin 104 in said recess 124 to lock rotatable knob 114 in position.

Appropriate markings can be provided on the outer casing of jigsaw 6 and knob 114 to allow the user to align recess 124 with channel 118. Further appropriate markings can be provided on the jigsaw casing to allow movement of lever arm 102 to the required position to ensure pin 108 is in a unlocked position for the scrolling mode or a locked position for the one or more jigsaw modes.

Figure 5:
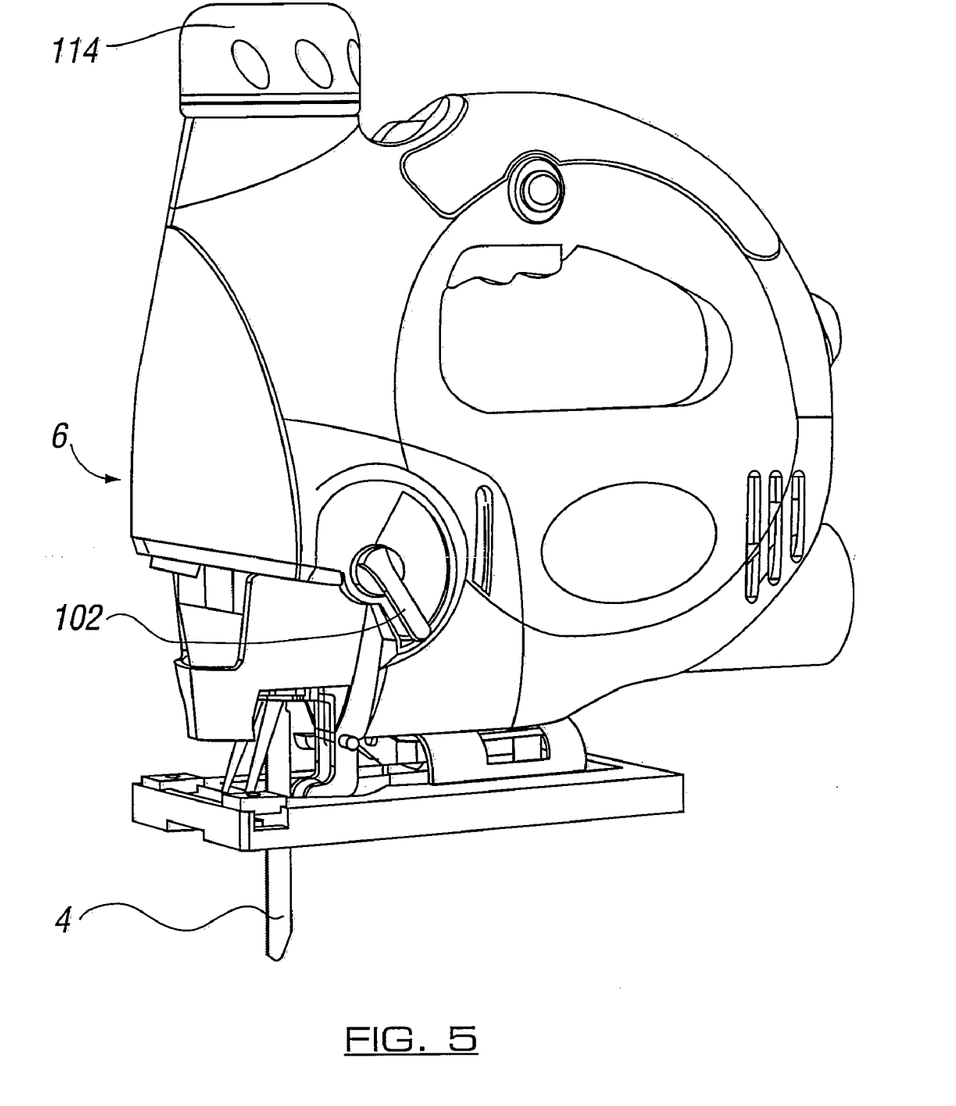
FIG. 5 is an outer view of a jigsaw in accordance with the present invention.

Light means in the form of a laser 130 can be provided on the front of jigsaw 6 to provide a visible path in front of the jigsaw for a user to follow during cutting. The path of light is typically directed downwardly towards blade clamping arrangement 2. The laser 130 can be battery powered or powered by mains power supply of jigsaw 6.

A motor 132 and gear mechanism 134 are provided for driving the reciprocating movement of elongate arm 118 in a conventional manner.

It will be appreciated by persons skilled in the art that the scrolling mechanism and clamping apparatus can be provided independently of each other or together. The tool can include any tool in which a working component, such as a saw blade, is required to be clamped.

The invention claimed is:

1. A tool, said tool including clamping apparatus for clamping a tool component, said clamping apparatus including one or more clamping members movable between a clamped position, wherein at least a portion of said tool component is secured in a required position in use, and an unclamped position, wherein said tool component portion is movable with respect to said one or more clamping members, said clamping apparatus further including user actuation means which are slidably mounted in said apparatus for actuating sliding movement of said one or more clamping members between said clamped and unclamped positions, characterized in that said clamping apparatus is attached to or integrally formed with shaft means which are substantially circular in cross section, wherein said one or more clamping members are pivotally mounted in said apparatus for radial movement with respect to the longitudinal axis of said apparatus between clamped and unclamped positions.

2. A tool according to claim 1 characterized in that said tool is a reciprocating saw or jigsaw.

3. A tool according to claim 1, further comprising:
wherein the clamping apparatus includes a body portion with an aperture; and
a blade clamped in the clamping apparatus, the blade having a protruding portion located in the aperture for further clamping the blade.

4. A saw, comprising:
an elongate arm member configured to reciprocate a saw blade; and
a clamping mechanism configured to secure the saw blade to the elongate arm member, the clamping mechanism including
a body portion attached to the elongate arm, the body portion defining a cavity with walls,
a pair of clamping members received in the cavity, the clamping members being wedge shaped with each having an outermost surface that has an outwardly tapered shape,
at least part of the walls of the cavity having a complementary shape with respect to the outwardly tapered shape of the outermost surfaces of the clamping members,
the clamping members each having a recess portion, and
an intermediate member including a protrusion portion engaged with the recess portions in the clamping members, the intermediate member being configured to move the clamping members in the cavity whereupon the complementary shape of the walls of the cavity engage with the outermost surfaces of the clamping members to rotate the clamping members between a clamped position wherein the saw blade is secured and an unclamped position.

5. The saw of claim 4, wherein the body portion defines an aperture in which a protrusion of the saw blade is received for further clamping of the saw blade.

6. The saw of claim 4, wherein the clamping mechanism includes:
a sleeve connected to the intermediate member to move the intermediate member; and
a housing secured to the body portion with the clamping members and the intermediate member sandwiched between the housing and the body portion.

7. The saw of claim 4, further comprising:
a scrolling mechanism for permitting scrolling movement of the saw blade, the scrolling mechanism including
a first locking mechanism including a locking pin,
a second locking mechanism linked to the elongate arm member, the second locking mechanism defining a recess configured to receive the locking pin, and
a user actuation mechanism coupled to the locking pin, the user actuation member being configured to be actuated by a user to move the locking pin between a locked position wherein the locking pin engages the recess of the second locking mechanism and a unlocked position wherein the locking pin disengages from the recess to permit scrolling movement of the saw blade.

8. The saw of claim 7, further comprising:
a linkage coupling the actuation member to the locking pin;
the second locking mechanism including a knob with a peripheral flange that has the recess defined therein for allowing the user to rotate the saw blade when the locking pin is in the unlocked position; and
the user actuation mechanism including a lever arm configured to rotate to move the locking pin between the locked position and the unlocked position.

* * * * *